United States Patent [19]

Whittington et al.

[11] Patent Number: 5,372,567
[45] Date of Patent: Dec. 13, 1994

[54] ROBOTIC ARM TOOL HEAD SELECTION AND STORAGE RACK

[75] Inventors: Glenn A. Whittington, Lino Lakes; Steven J. Austin, Minneapolis, both of Minn.

[73] Assignee: Robotics and Automation Corporation, Fridley, Minn.

[21] Appl. No.: 23,682

[22] Filed: Feb. 26, 1993

[51] Int. Cl.5 .......................................... B23Q 3/155
[52] U.S. Cl. .................................. 483/29; 219/86.8; 483/13; 483/59; 483/901
[58] Field of Search .............. 483/31, 32, 55, 59, 483/13, 901, 28, 29; 219/86.8; 409/144; 279/900

[56] References Cited

U.S. PATENT DOCUMENTS

| | | | |
|---|---|---|---|
| 4,551,903 | 11/1985 | Bisiach | 219/86.8 X |
| 4,624,044 | 11/1986 | Bredow et al. | 483/29 |
| 4,637,121 | 1/1987 | Wortmann | 483/28 X |
| 4,985,983 | 1/1991 | Otto et al. | 483/29 |
| 5,018,266 | 5/1991 | Hutchinson et al. | 483/32 X |

FOREIGN PATENT DOCUMENTS

| | | | |
|---|---|---|---|
| 0156141 | 9/1982 | Japan | 483/32 |
| 0104278 | 6/1984 | Japan | 219/86.8 |
| 0656803 | 4/1979 | U.S.S.R. | 483/59 |
| 0673421 | 7/1979 | U.S.S.R. | 483/32 |

Primary Examiner—Z. R. Bilinsky
Attorney, Agent, or Firm—Leo Gregory

[57] ABSTRACT

A segmented tool rack having a plurality of individual bays to retain tool heads for an automated selection by a robotic arm, the tool heads being positively locked in the tool rack and upon selection by a robotic arm, the tool head remains in locked position until locked-onto the robotic arm at which time it is unlocked from the tool rack avoiding the possibility of an accidental dropping of a tool head and further, the tool head remains locked in position on said rack in the event of a loss of power.

8 Claims, 7 Drawing Sheets

ROBOTIC ARM TOOL HEAD SELECTION AND STORAGE RACK

BACKGROUND OF THE INVENTION

1. Field of Invention

Relates to an automatic tool head selection from a tool rack.

2. Description of the Previous Art

Automatic manufacturing has become a field of rapidly advancing technology. Keeping in step with such advancement are the numerous devices to increase the flexibility of automated work by the development of work cells or robot arms in connection with the use of quick change tool systems.

Generally a tool change system is designed for a specific family of related uses wherein the tool changes by use of robotic arms are for a predetermined sequence of tool applications.

SUMMARY OF THE INVENTION

It is desirable to provide a tool supplying system for end of arm tooling that is compatible for use with a wide range of end of arm devices or tool heads having wide variations in weight, power requirements, multiple control, interlock and position sensor signals, multiple gas and fluid connections as well as high flow pneumatic line connections as well as the ability to change to multiple horsepower air motors with various surface treatment wheels and for use with various magnetic vacuum or finger grippers for material handling.

It is a particular object herein to provide apparatus for rapid interchange of a wide spectrum of end of arm tooling to be compatible with various sizes of robot or other automated tool head handling devices.

It is another object herein to provide a storage rack for various tool heads, said rack having a plurality of bays each of which embodies automatic locking and unlocking of the tool head, the same being held in locked position until released to a pick up device such as a robot arm and locked thereon, thus assuring no accidental dropping of a tool head.

It is also an object herein to provide a storage rack for tool heads that provides identification for each tool head held on the several bays.

These and other objects and advantages of the invention will be set forth in the following description made in connection with the accompanying drawings in which like reference characters refer to similar parts throughout the several views.

DESCRIPTION OF A PREFERRED EMBODIMENT

Figure 2:
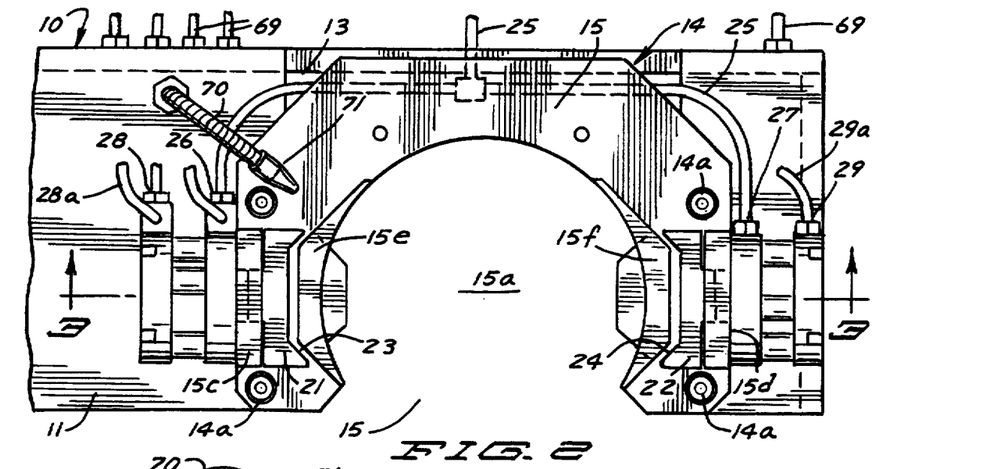
FIG. 2 is a top plan view taken on line 2—2 of FIG. 1.
Figure 3:
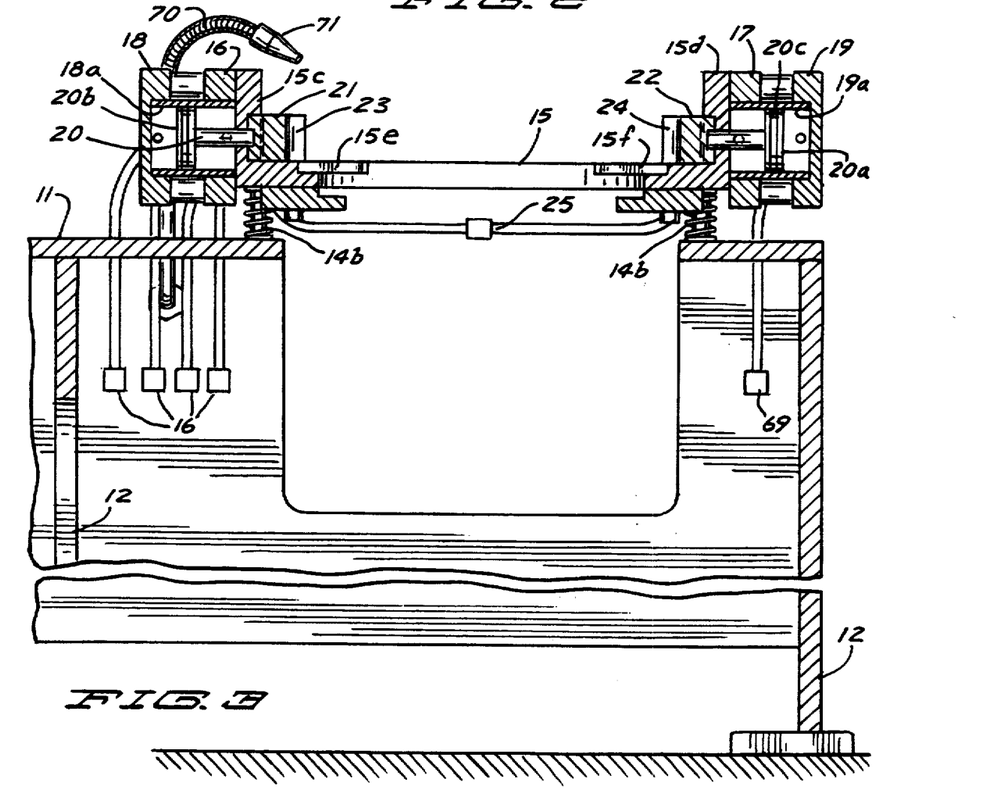
FIG. 3 is a view in vertical section taken on line 3—3 of FIG. 2 as indicated.
Figure 4:
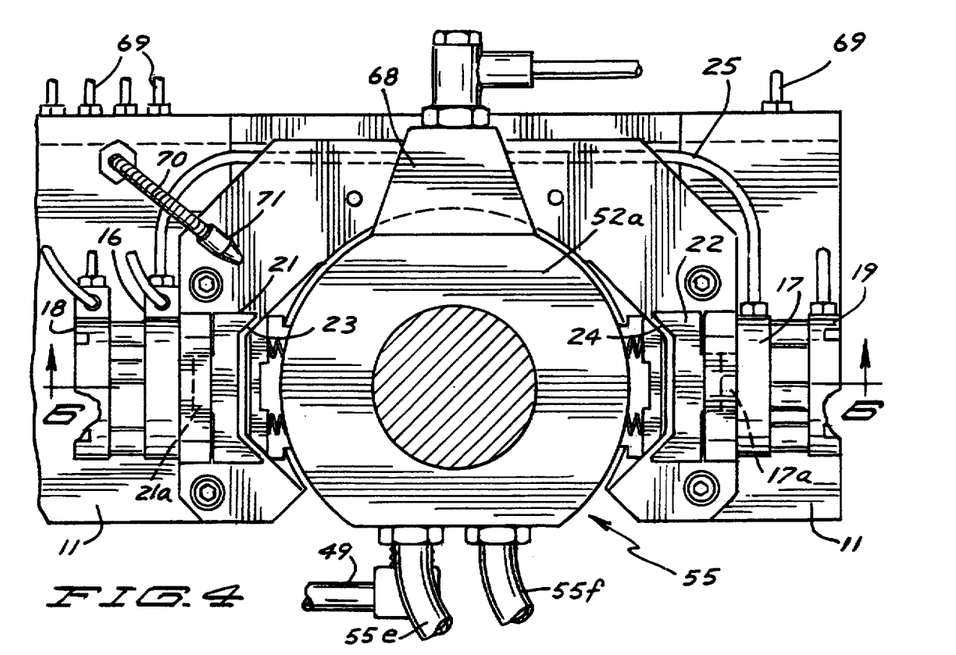
FIG. 4 is a top plan view of the view shown in FIG. 1.
Figure 5:
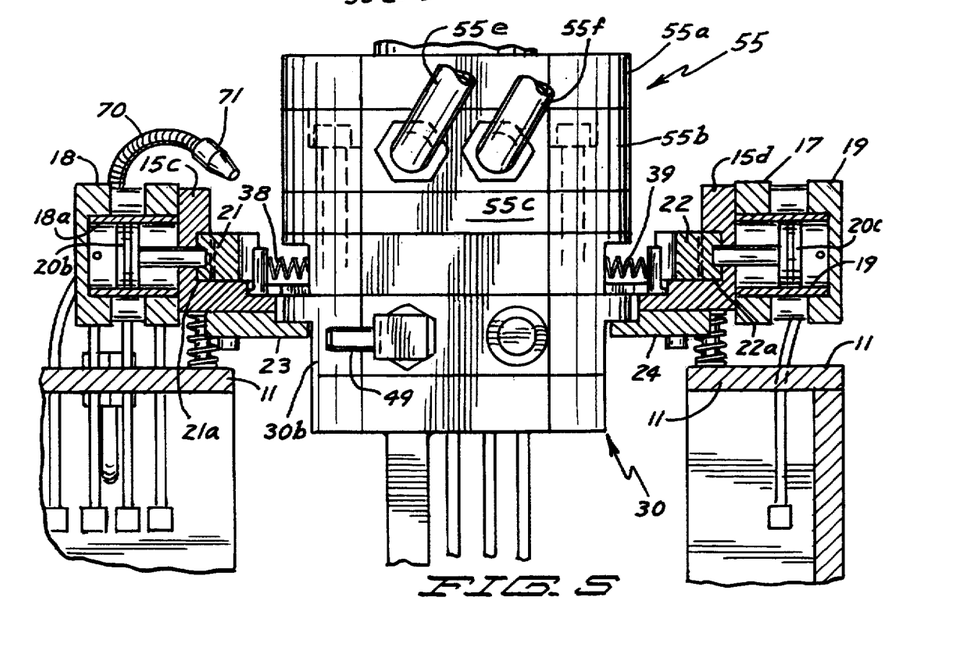
FIG. 5 is a front elevational view of the view shown in FIG. 4.

Referring to the drawings and more particularly to FIG. 2, a segment 10 of a tool rack is shown. The complete rack, not shown, may be of any desired practical length. Said tool rack comprises a top plate member 11 supported at intervals by legs 12 and has at regular intervals cut out portions 13 into which are disposed bay members or bays of which bay 14 is shown installed in operating position secured by bolts 14a extending through overlapping portions of said bay and said rack segment 10 as illustrated and said bay is given underlying resilient support by coil springs 14b.

Said bay 14 basically is a plate member 15 formed into what could be regarded as a hexagonal figure having an open center or central area 15a and an open front side 15b. At opposite or facing sides of said open central area adjacent said open front side are opposed parallel wall sections 15c and 15d respectively having forwardly projecting ledges 15e and 15f.

Mounted onto said bay extending rearwardly of said parallel wall sections and integral therewith are upstanding walls 16 and 17 in parallel relationship and mounted onto the rear of each of said rear walls are cylindrical air conduit connections 18 and 19 and centrally of each of said connections axially thereof are pneumatic cylinders 18a and 19a. Disposed in said cylinders are pistons 20 and 20a having connected to the facing ends thereof rectangular pressure plates 21 and 22 having recessed faces with inclined ends as at 23 and 24. Said pressure plates have central rearward rectangular projections 21a and 22a which are recessed into accommodating recessed openings 16a and 17a. Said pistons have inner ends or heads 20b and 20c of the full diameter of the interior of said cylinders and the shafts of said pistons as indicated at 20 and 20a are of a smaller diameter extending through said upstanding walls 16 and 17 facing said cylinders, said walls are integral with said cylinders and retain said piston heads within said cylinders.

Underlying said parallel wall sections are supporting base plate members 23 and 24, the same being secured to said overlying parallel bay sections by appropriate securing means such as Allen headed screws.

At the rear of said air conduit connections are air conduit fittings 26, 27, 28 and 29, said fittings 26 and 27 being interconnected by a common air hose 25 and said fittings 28 and 29 running to pressurized air sources.

Within said air conduit connections, the fittings 28 and 29 will have connected air hoses 28a and 29a which with pressurized air communicate respectively with said cylinders 18a and 19a through appropriate channels within said air conduit connections 18a and 19a.

Adapted to fit into said open central area 15a is what is indicated as being a tool holder 30 (FIGS. 1, 5-7).

Figure 10:
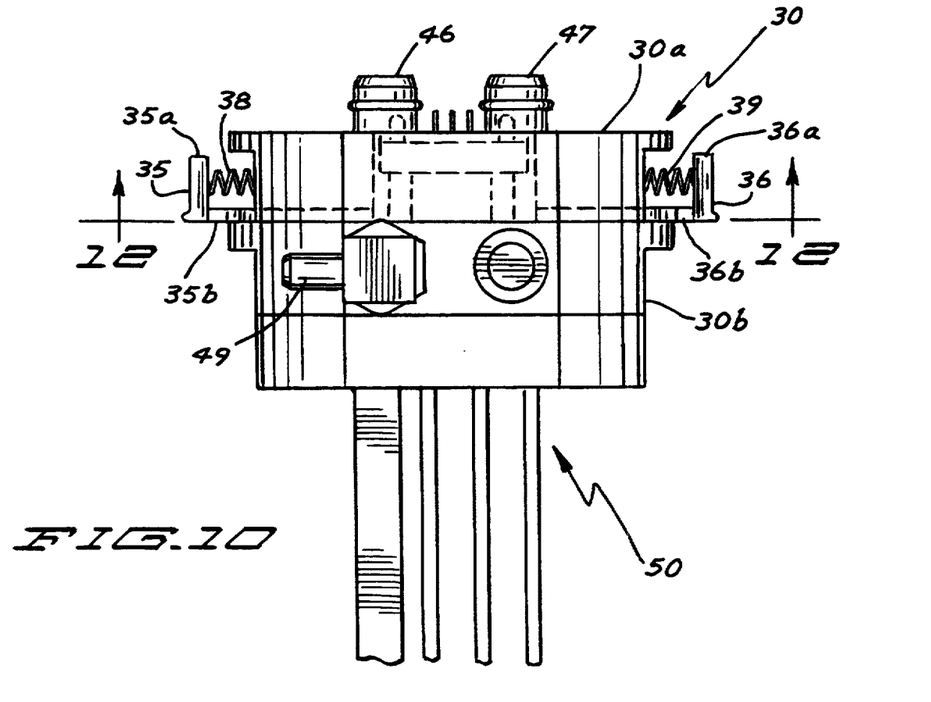
FIG. 10 is a view in elevation of a detail of structure.
Figure 11:
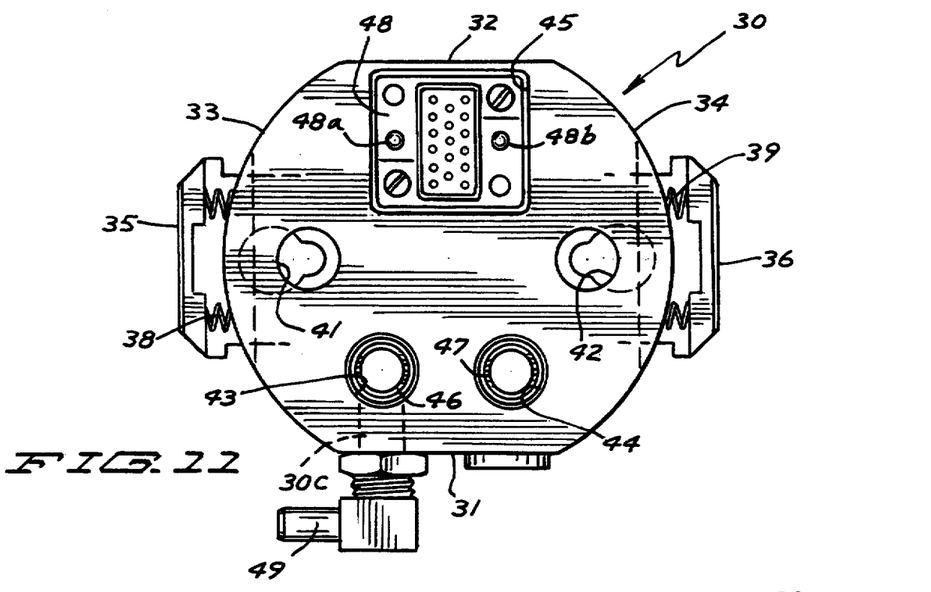
FIG. 11 is a top plan view of a detail of structure.

Said tool holder 30 is shown as being formed of layers 30a and 30b. Layer 30a has parallel front and rear walls 31 and 32 and has opposed arcuate side walls 33 and 34 (FIGS. 10,11).

At said sides are spring loaded latch members 35 and 36 (FIGS.10,11) having upstanding front walls 35a and 36a adapted to mate with said pressure plates 21 and 22 and having bottom walls 35b and 36b adapted to slide inwardly of recessed areas 37 and 38 of the layered portion 30a. The area 37 has a pair of upstanding pins 37a adjacent the side wall 33 and a second pair of pins 37b rearwardly of said recessed area 37. Said latch member 35 has recesses 35c and 35d at each side thereof as shown into which the pins 37a are received to limit the movement of said latch members into or inwardly of said recessed area. Said latch member 35 has a rear portion 35d of reduced width guided by the spaced pair of pins 37b to be moved rearwardly into an accommodating reduced rear portion of said recess 37. The latch member 36 and its; adjacent recess 38 correspond to said latch member 35 and its corresponding recess 37.

Said latch members respectively have centrally positioned key hole openings 35f and 36f. Said latch members are normally held in a latching outward extended position by their respective pairs of coil springs 38 and 39 as in FIGS. 10 and 11.

Adjacent said side wails 33 and 34 centrally thereof to coincide with the openings in said latch members when in unlatched or pushed in position are the openings 41 and 42 in the layer 30a. Adjacent said front wail 31 are a pair of spaced vertical passages or bores 43 and 44. Adjacent said rear wall is a square opening 45.

Disposed into said passages 43 and 44 are upwardly projecting posts 46 and 47. Disposed into said opening 45 is a circuit board 48 to be further described.

Underlying said layer 30a is layer 30b which has an air passage 30c having an exterior air hose fitting 49 secured therein.

Disposed into said opening 45 and secured to said underlayer is said circuit board 48 to be available for auxiliary purposes. Said upstanding pins 48a and 48b are guide pins as will be described.

Figure 1:
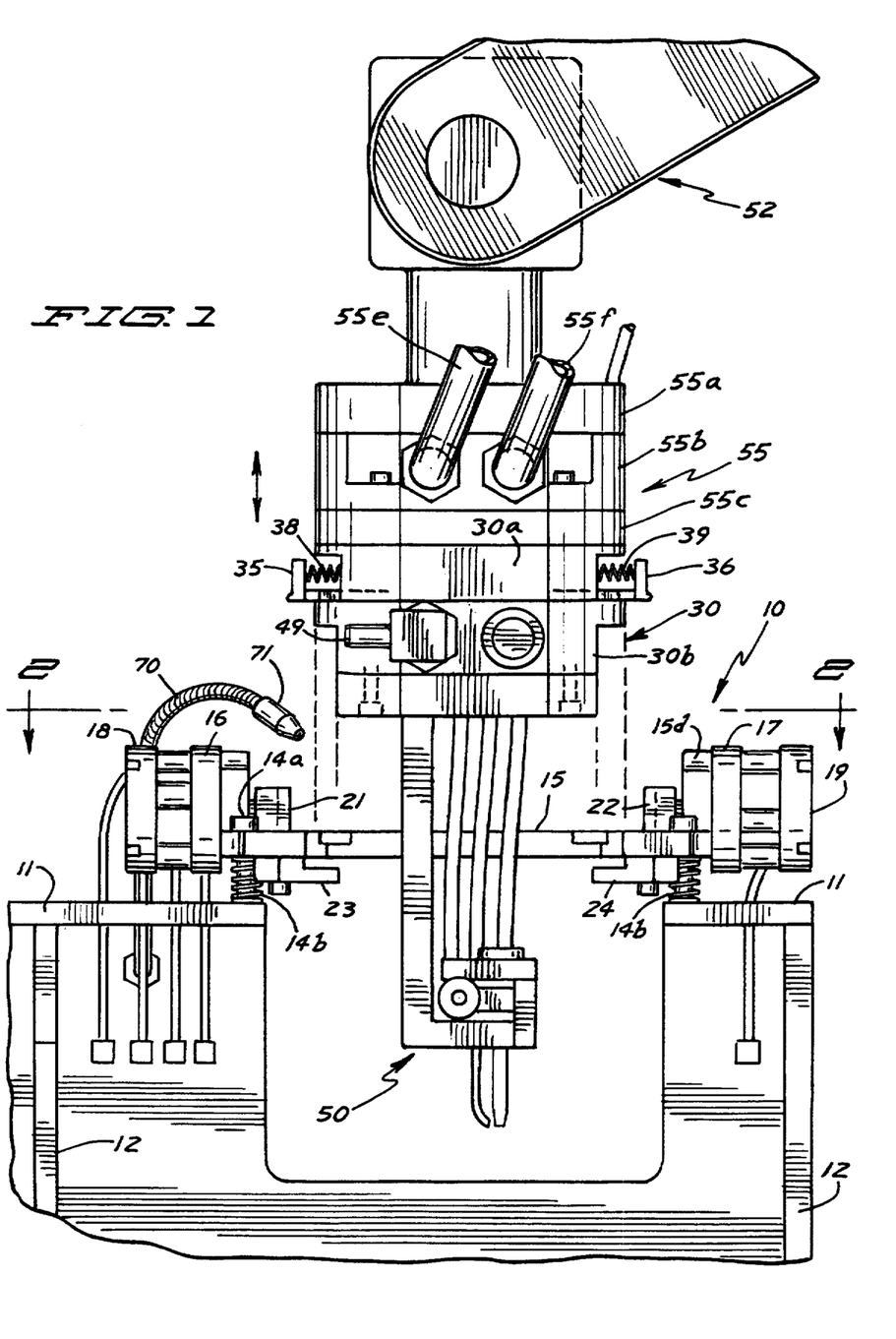
FIG. 1 is an exploded view in elevation in which a tool holder carrying tool head is partially withdrawn from a position from a bay in a tool rack.

What has been described here has been a tool holder and as shown in FIG. 1, depending from the tool holder 30 and appropriately secured to the underside of the layer 30b is a welding head 50. Placed on the various bays in the segments of said rack will be a number of tool heads available for use as selected by an automated tool head handling device such as a robot or robot arm, the inclusion of which is not part of the invention herein.

Adapted to be attached to a robot arm 52 as representative of an automated tool handling device is a structure 55 referred to as a wrist. The tool holders 30 are positioned in each of the bays and the wrist with robot arm attached by attachment to any of the tool holders as may be programmed or predetermined select a designated tool for a work effort in the automation of the operation herein.

Said wrist 55 as shown here to be a three layered structure comprising layers 55a, 55b, and 55c. The configuration of said wrist 55 is the same as that of the tool holder 30 and the layer 55b has openings 56 and 57 to accommodate the posts 46 and 47.

Figure 8:
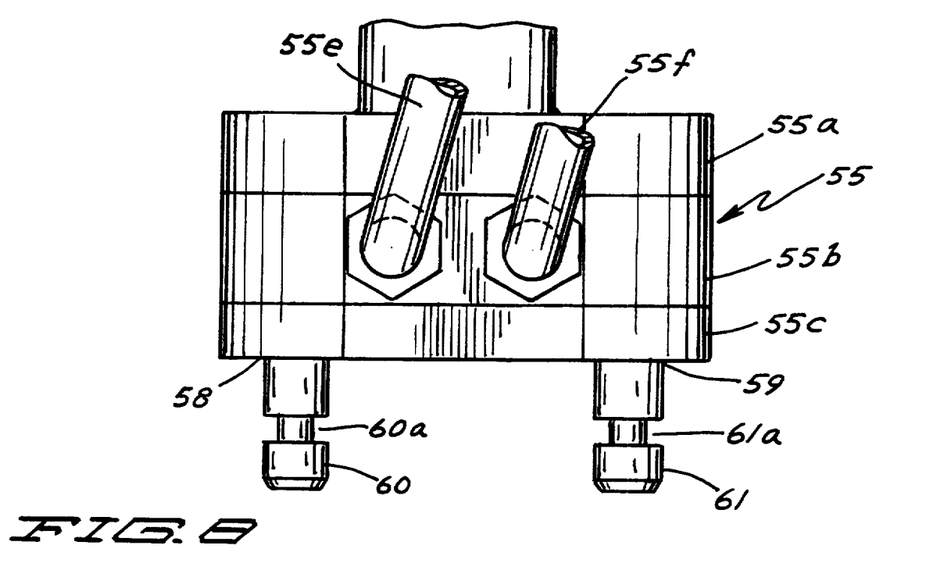
FIG. 8 is a front elevational view showing a detail of structure.

Corresponding to said openings 41 and 42 are openings 58 and 59 and outstanding therefrom are posts 60 and 61 which are received into said openings 41 and 42 to be engaged and latched by said latch members 35 and 36. Said posts have annular grooves 60a and 61a spaced from the outer ends thereof (FIG. 8).

Corresponding to said opening 45 is an opening 63 having therein a floating circuit board 66 and within said board coinciding with said pins 48a and 48b are openings 66a and 66b. Hence when said layer 55a overlies the layer 30 there is an exact interfitting.

Figure 9:
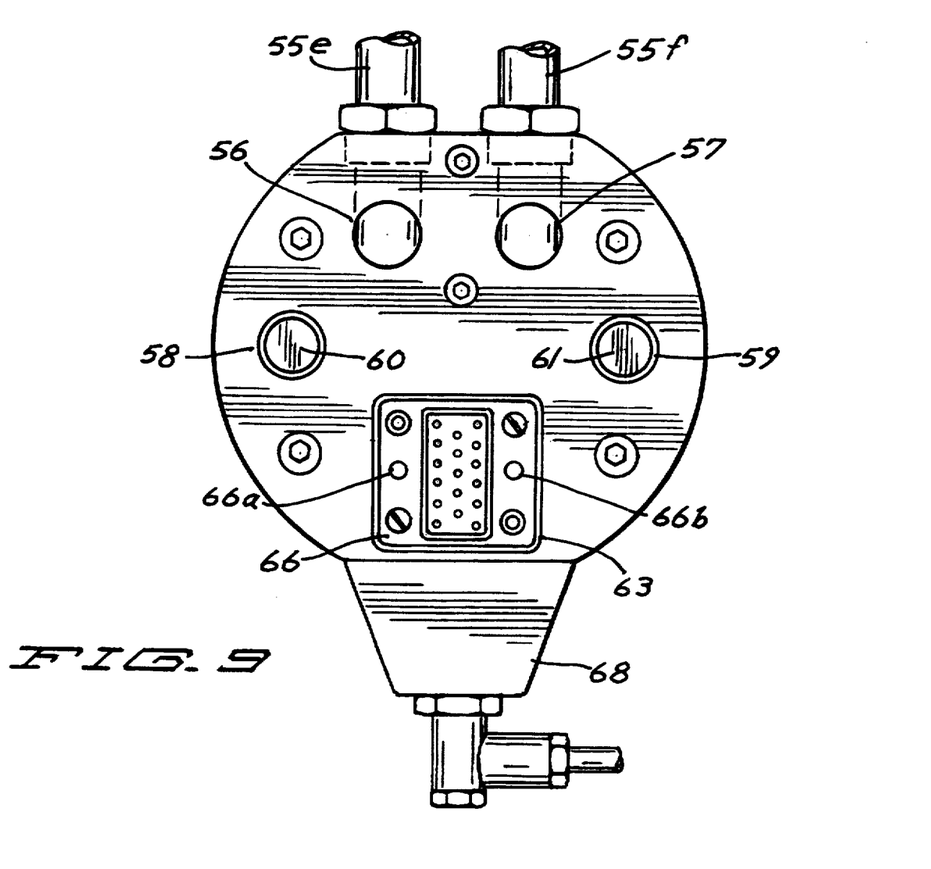
FIG. 9 is a bottom plan view of a detail of structure.

The posts 60 and 61 are disposed into the passages 41 and 42 engaging the key openings of the latch members 35 and 36. Said latch members, as will be described, are pushed inwardly, said posts extend through the key hole openings 35f and 36f and upon being released the narrowed portions of the key hole openings engage said annular grooves in locking engagement of said posts (FIG. 9 and 11).

Projecting outwardly of said layer 55b is a projection 68 being particularly adapted to have a motor attached thereto for a work purpose not a part of the invention herein.

Said wrist and tool holders are adapted for various air hose attachments for various phases of operation such as 55e and 55f.

Said rack as indicated in FIG. 2 is provided with variously placed air hose attachments all in communication with a pressurized air supply, said hose attachments being indicated as at 69.

Mounted onto the top wall of said rack is a flexible conduit 70 having an adjustable nozzle 71 particularly adapted to be positioned to sweep a stream of air across said bay 14 while an operation is in effect to blow airborne contaminants away of the bay and its immediate working area.

OPERATION

The tool rack comprising the invention herein is adapted for uses in an automated procedure wherein tool heads are arranged in the sequence in which they will be selected for work duty by a pre-programmed arrangement where a robotic arm, for example, is caused to select, pick up and put tool heads to work in a pre-designated sequence.

As described the tool heads are retained by tool holders in bays, a bay being a segment of a tool rack. An essential novelty of the arrangement herein is that a tool head is securely held on the rack in a locked position until it is selected for a work effort, and the robot arm, for example, upon selecting a tool is placed in a latched engagement therewith before removal of the tool from said rack.

Figure 6:
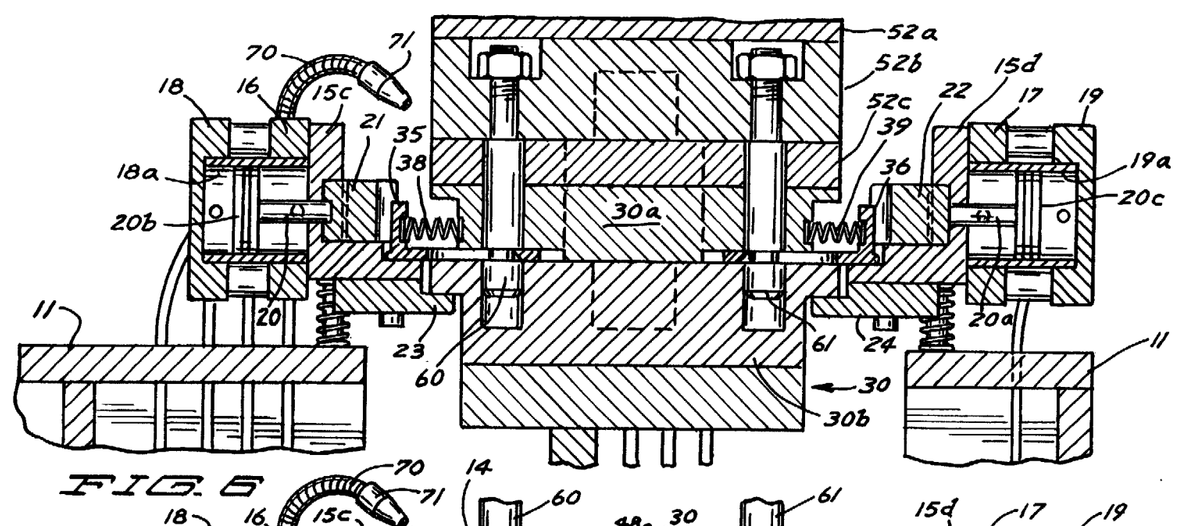
FIG. 6 is a broken view in vertical section showing a tool holder holding the tool holder in locked position.
Figure 7:
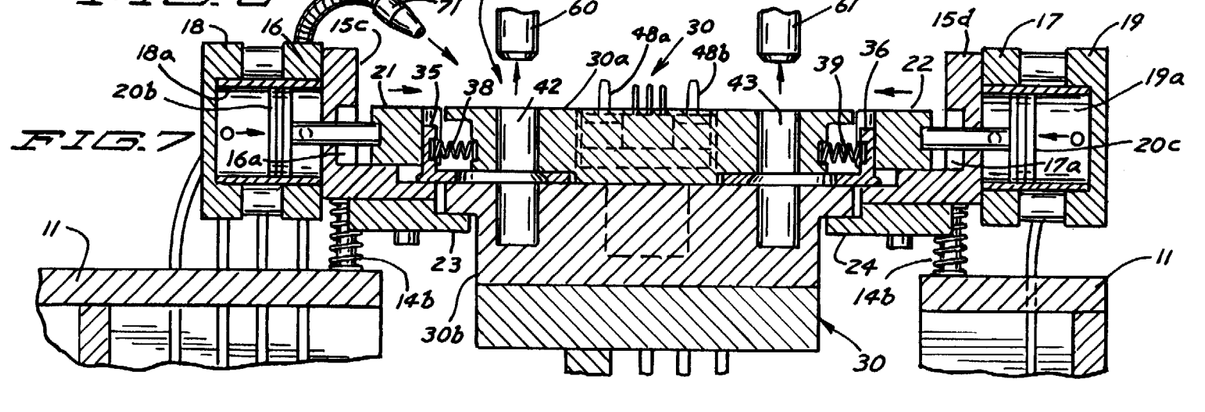
FIG. 7 is a view similar to that of FIG. 6 showing the tool holder in unlocked position.

The latch members 35 and 36 are self latching as naturally urged into latching position by the coil springs 38 and 39 as shown in FIGS. 10 and 11. In FIGS. 6 and 7, the tool holder 30 embodying the latching members is shown positioned in the bay. With reference to FIG. 2, the air line or hose 25 is shown connecting the air line fitting 26 and 27. Pressurized air is applied to said line 25 to bear against the pistons 20 and 20a which engage the latching members 35 and 36 moving them inwardly of the bay 14 to unlatching position for removal by a robotic arm 52 of the wrist member 55 to which the robotic arm is attached and the tool holder and tool head to be used for a work effort.

Figure 12:
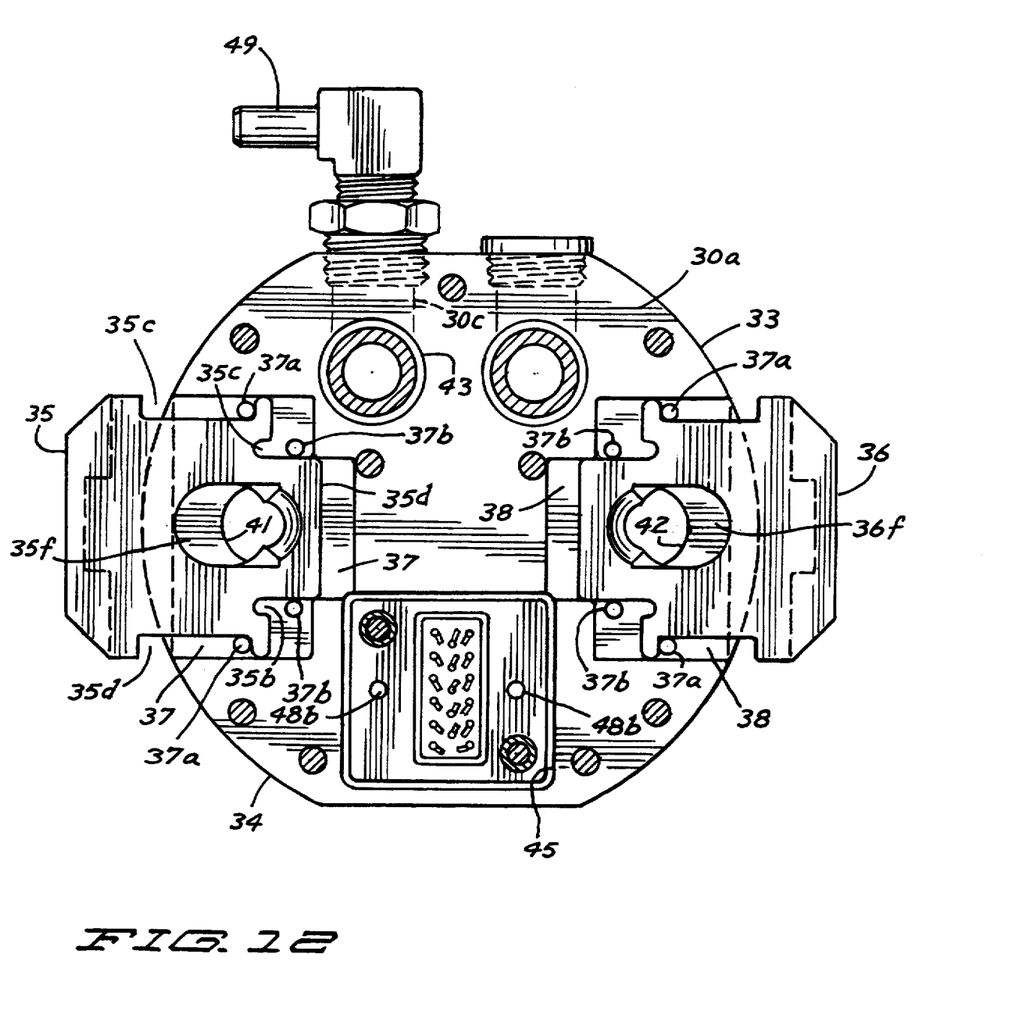
FIG. 12 is a bottom plan view taken on line 12—12 of FIG. 10 as indicated.

The wrist member has its two posts 60 and 61 engaged by the key hole openings of said latch members 35 and 36. When the pressure in the line 25 is released, the springs 38 and 39 move the latch members outwardly causing the narrowed key openings as shown in FIGS. 11 and 12 to lockingly engage the annular grooves 60a and 61a of their respective posts as illustrated in FIG. 6. In FIG. 7, the latching members are shown in unlatching position whereby said wrist having an attached robot arm is readily removed by simply being raised.

With reference to the circuit boards 32 and 63, neither are fixed in position when the portion 30a of the tool holder 30 and a corresponding portion 55b of said wrist 55 are joined, the pins 48a and b are inserted into the holes 66a and 66b to align the two wiring boards for a precise connection or mating of the contacts of the two boards.

The air hose connection and the wiring boards are auxiliary to the description of the tool rack herein given and what is essential here is the arrangement and function of the latch members in retaining all members held by the tool holder in a secure position until secured to a robot arm for removal to be applied to a work effort.

Thus it is seen that said rack has an integral role in the automatic selection and use of tool heads.

It will of course be understood that various changes may be made in the form, details, and arrangement of the device of the invention without departing from the scope of the invention which generally stated consists in an apparatus capable of carrying out the objects above set forth, such as discussed and defined in the appended claims.

What is claimed is

1. In connection with an automatic tool changing system, a tool rack releasably holding tool heads, having in combination
   a plurality of tool holding segments,
   a bay member disposed in one of said segments,
   a tool holder adapted to be releasably received in said bay member,
   a tool head secured to said tool holder,
   a wrist member adapted to have attachment to a robot arm,
   said wrist member being adapted to overlie said tool holder,
   latch members respectively at each side of said tool holder,
   means urging said latch members into latching position,
   operative means moving said latch members to unlatching position to receive said wrist member,
   means retaining said tool holder in said bay member while latch members are in unlatching position,
   said operative means releasing said latching members to latch said wrist member and release said tool holder,
   whereby said robot arm lifts said wrist member and tool holder from said bay member for application to a work effort.

2. The structure of claim 1, wherein
   said latch members each comprise an angled plate member having an upstanding end wall and a bottom plate,
   a recess in said tool holder at each end thereof to receive said bottom plates,
   a key hole opening in each of said bottom plates,
   vertical bores in said tool holder in alignment with said key hole openings in said bottom plates of said latch members when moved to unlatched positions,
   coil springs engaging said end walls of said plate members urging said latch member to latch positions,
   said wrist member having posts disposable into said bores,
   said posts having annular grooves adjacent their outer ends, and
   in latched position, said annular grooves are respectively disposed into said key hole openings and secured thereby.

3. The structure of claim 1, wherein
   said operative means comprises a cylindrical air conduit connection at each side of said bay member,
   said connections each embody a pneumatic cylinder,
   a piston in each of said cylinders,
   outwardly facing plates at outer ends of said pistons,
   said plates respectively engaging said latch members,
   pressurized air lines running to said pneumatic cylinders, and
   said pistons actuated by said pressurized air lines move said latch members to unlatching position.

4. The structure of claim 1, including
   a pressurized air line to said tool rack,
   a conduit having an air nozzle carried by said rack,
   said air line connected to said conduit directing an air stream across said rack.

5. The structure of claim 1, including
   resilient cushion means disposed between said bay member and the underlying rack segment.

6. The structure of claim 1, including
   coil springs underlying said bay member supported upon said rack segment cushioning the impact of a robot arm and wrist descending upon for attachment to said tool holder.

7. In connection with a quick change tool system, a tool holding rack, having in combination
   a plurality of tool holding segments,
   a bay member mounted onto a tool holding rack segment,
   a tool holder removably disposed in said bay member,
   said tool holder having a tool secured thereto,
   said bay member having a pair of facing spaced apart pneumatic cylinders,
   said cylinders each having a piston,
   said pistons having a facing relationship,
   a pressurized air line having a common source of pressurized air running to said cylinders,
   said cylinders having facing plate members movable by said pistons,
   said tool holder having opposed latching members respectively mating with said facing plate members,
   means urging said latch members into latching position,
   said air line pressurized causing said pistons to move said latch members into unlatching position,
   a wrist member having attachment to a robot arm adapted to be disposed to overlie said tool holder for engagement therewith with said latch members in unlatching position, and
   means depressurizing said air line releasing said latch members to be urged to latch position locking the engagement of said wrist to said tool holder.

8. In connection with an automatic tool changing system, a tool holding rack, having in combination
   a plurality of tool holding segments,
   a bay member adapted to be received in a segment,
   a tool holder adapted to be received in said bay,
   a tool carried by said tool holder,
   a wrist member adapted to have attachment to a robot arm,
   said wrist member adapted to overlie said tool holder,
   latch members respectively at each side of said tool holder, means urging said latch members into latching position, said bay member carrying a pneumatic cylinder adjacent each of said latch members, a piston in each of said cylinders respectively actuating said latch members, an air line connecting to a pressurized source of air running to said cylinders, means pressurizing said hit line to actuate said pistons to urge said latch members to unlatching positions, said wrist member having means engaging said latch members in unlatching position, said means depressurizing said air line to release said latch members to latching position to lockingly engage said wrist member in attachment to said tool holder, whereby said robot arm lifts said wrist member and the attached tool holder and tool into an operating work position.

* * * * *